United States Patent [19]

Suzuki et al.

[11] Patent Number: 5,526,161
[45] Date of Patent: Jun. 11, 1996

[54] COMMUNICATION CONTROL METHOD AND APPARATUS

[75] Inventors: Noriyuki Suzuki, Tokyo; Kazutoshi Shimada, Yokosuka; Eisaku Tatsumi, Yokohama; Shinichi Sunakawa, Kawasaki; Katsuhiko Nagasaki, Ichikawa, all of Japan

[73] Assignee: Canon Kabushiki Kaisha, Tokyo, Japan

[21] Appl. No.: 262,274

[22] Filed: Jun. 20, 1994

[30] Foreign Application Priority Data

Jun. 22, 1993 [JP] Japan ............................ 5-150259

[51] Int. Cl.⁶ .......................................... H04B 10/00
[52] U.S. Cl. ..................... 359/172; 359/154; 359/155; 359/159; 359/152
[58] Field of Search ............................ 359/110, 142, 359/143, 145, 152, 153, 154, 157, 155, 159, 172, 174, 144, 161

[56] References Cited

U.S. PATENT DOCUMENTS

| | | | |
|---|---|---|---|
| 4,864,651 | 9/1989 | Ogiwara et al. | 359/161 |
| 5,060,304 | 10/1991 | Solinsky | 359/152 |
| 5,282,073 | 1/1994 | Defour et al. | 359/172 |
| 5,359,448 | 10/1994 | Laszlo et al. | 359/149 |

FOREIGN PATENT DOCUMENTS

| | | | |
|---|---|---|---|
| 0483549A2 | 5/1992 | European Pat. Off. | H04B 10/10 |
| 0066154 | 5/1980 | Japan | 359/159 |
| 63-220034 | 9/1988 | Japan | F24F 11/02 |
| WOA9012462 | 10/1990 | WIPO | H04B 10/14 |

Primary Examiner—Leo Boudreau
Assistant Examiner—Bhavesh Mehta
Attorney, Agent, or Firm—Fitzpatrick, Cella, Harper & Scinto

[57] ABSTRACT

A communication apparatus transmits a test message in one direction by the transmitting unit having narrow directivity capable of changing the transmitting direction, and an indication message which indicates that the test message is being transmitted by a transmitting unit having non directivity. Accordingly, the indication message is transmitted at least to the communicating party's apparatus. Subsequently, the transmitting direction of the test message is sequentially changed, and a similar process is performed. When the communicating party's apparatus detects a reception of the indication message, information indicating a level of the test message is transmitted to the transmitting apparatus as a response. The communication apparatus at the transmitting side detects the direction where the communicating party exists by receiving the information indicating the level. Hereinafter, the information communication is performed to adjust the transmitting unit of narrow directivity to the determined direction.

22 Claims, 9 Drawing Sheets

⌂ : LED GROUP 6

⌂ : LED GROUP 10

COMMUNICATION CONTROL METHOD AND APPARATUS

BACKGROUND OF THE INVENTION

The present invention relates to a communication control method and apparatus and, more particularly, to a communication control method and apparatus capable of communicating by lights and waves (such as electromagnet, acoustic, etc.) without using wires.

Recently, an apparatus which performs information communication through lights and waves without using wires between computers or the computer and peripheral apparatuses has been spreading. The conventional apparatus has communication means of a single system whose directional significance including non-directional significance (even if a plurality of channels can be provided) is unchangeable.

In general, a wave intensity in wave propagation is in inverse proportion ratio to the square of distance. Accordingly, if communication in a certain distance is performed at the minimum output (electric power), output means or input means including a narrow directivity (e.g., Yagi Antenna or Parabolic Antenna) is used. Accordingly, the conventional technique is suitable for communication among fixed apparatuses since the directivity of the input/output means is fixed.

However, the conventional technique is not suitable when at least one apparatus is not fixed, for example, when one apparatus is a portable terminal and the other is the host apparatus of the portable terminal, and both are used in a same room (or same floor). In this case, the problem arises in that a user needs to adjust the direction of the input/output means whenever the portable terminal is moved.

If a wide directivity or non-directivity is used for the input/output means, the above problem can be solved. However, in this case, considerably large amount of power output is required in comparison with the case of the narrow directivity, thus large amount of electric power is consumed.

SUMMARY OF THE INVENTION

Accordingly, it is an object of the present invention to provide a communication control apparatus and control method capable of performing an information transmission to the communicating party's apparatus by using a transmitting unit having a narrow directivity, even if the position of the apparatus or communicating party's apparatus is moved.

According to the present invention, the foregoing object is attained by a communication apparatus which performs an information communication by using wave motion in space propagation, comprising: first transmission means for transmitting information in a narrow directivity; changing means for changing the direction of directivity of the first transmission means; second transmission means for transmitting information in a wide directivity or non directivity; reception means for discriminating and receiving the information transmitted from the first and second transmission means; a plurality of testing means for performing a process which transmits a test message in a predetermined direction by the first transmission means, and a message indicating that the test message is being transmitted by the second transmission means whenever the first transmission means is changed by the changing means; and determination means for determining the transmitting direction of the first transmission means in accordance with the message transmitted from the communicating party, which is received by each of the testing processes of the testing means.

The foregoing object is also attained by a control method in a communication apparatus comprising: first transmission means for transmitting information in a narrow directivity by using a wave motion in a space propagation; changing means for changing the direction of directivity when a transmission is performed by the first transmission means; second transmission means for transmitting information in a wide directivity or non directivity; and reception means for discriminating and receiving the information transmitted from the first and second transmission means, the method comprising the steps of: transmitting a test message in a predetermined direction by the first transmission means, while the second transmission means transmits a message indicating that the test message is being transmitted whenever the first transmission means is changed by the changing means; and determining the transmitting direction of the first transmission means in accordance with the message transmitted from the communicating party which is received by each of the testing processes of the testing means.

It is another object of the invention to provide a communication system and control method which efficiently performs information communication with the communicating party's apparatus by using a transmitting unit having a narrow directivity, even if the arrangement of the apparatus at the transmitting side or the communicating party's apparatus is moved.

The foregoing object is attained by a communication control system which performs information transmission by using wave motion in space propagation, an apparatus at a transmitting side comprising: first transmission means having a narrow directivity; second transmission means having a substantially non directivity; changing means for changing a transmitting direction by the first transmission means; test transmission means for transmitting a test message by the first transmission means, and an indication message which indicates that the test message is being transmitted from the second transmission means; control means for controlling the control means and energizing the test transmission means whenever the transmitting direction is changed by the first transmission means; first reception means for receiving an acknowledgment message from the communicating party's apparatus by the control means when the test transmission means is energized; and determination means for determining the transmitting direction of the first transmission means based on the acknowledgment message received by the reception means, and the apparatus of the communicating party comprising: second reception means for discriminating and receiving the test message and indication message transmitted from the apparatus at the transmitting side; and third transmission means for transmitting the reception state of the test message as an acknowledgment message when the indication message is received by the second reception means.

The foregoing object is attained by a control method of communication control system which performs an information transmission by using wave motion in space propagation, an apparatus at a transmitting side comprising: first transmission means having narrow directivity; second transmission means having substantially non directivity; changing means for changing the transmitting direction by the first transmission means; and first reception means for receiving a message from the apparatus at the communicating party, and the apparatus at the communicating party comprising: second reception means for discriminating and receiving a test message and an indication means; and third transmission means for transmitting a message to the first reception means, and the apparatus at the transmitting side comprising: test transmission step of transmitting a test message from the first transmission means, and an instruction which instructs that the test message is being transmitted; control step of energizing the test step when the changing means is controlled, and the transmitting direction of the first transmission means is changed; step of receiving an acknowledgment message from the communicating party by the first reception means when the test transmission step is repeatedly energized by the control step; and determination step of determining the transmitting direction of the first communication means based on the acknowledgment message received by the reception means, and the apparatus at the communicating party comprising: step of transmitting the reception state of the test message as an acknowledgment message by the third transmission means when the indication message is received by the second reception means.

It is still another object of the invention to provide a communication apparatus capable of receiving information properly from the communicating party's apparatus by using a receiving unit having a narrow directivity, even if the arrangement of the apparatus or communicating party's apparatus is moved.

The foregoing object is attained by a communication apparatus which performs an information reception by using a wave motion in a space propagation, comprising: transmission means having non directivity; reception means having a narrow directivity capable of setting the receiving direction in a desired direction; first control means for transmitting a message which request the communicating party's apparatus to transmit a test message via the transmission means; changing means for changing the receiving direction of the reception means whenever the first control means performs a transmission process of the requested message; second control means for performing reception of the test message from the reception means whenever the changing means is energized; and determination means for determining the most suitable direction of the reception means by the second control means.

Furthermore, the foregoing object is attained by a control method of the communication apparatus including transmission means having substantially no directivity and reception means having narrow directivity capable of setting a receiving direction to a desired direction, which performs information reception by using wave motion in space propagation, comprising: message transmission step of transmitting a message which requests the communicating party to transmit a test message via the transmission means; changing step of changing the receiving direction whenever a transmission process of the request message is performed; reception step of receiving the test message from the reception means whenever the receiving direction of the receiving means is changed by the changing step; and determination step of determining the most suitable direction of the reception means based on the reception result by the reception step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

Figure 1:
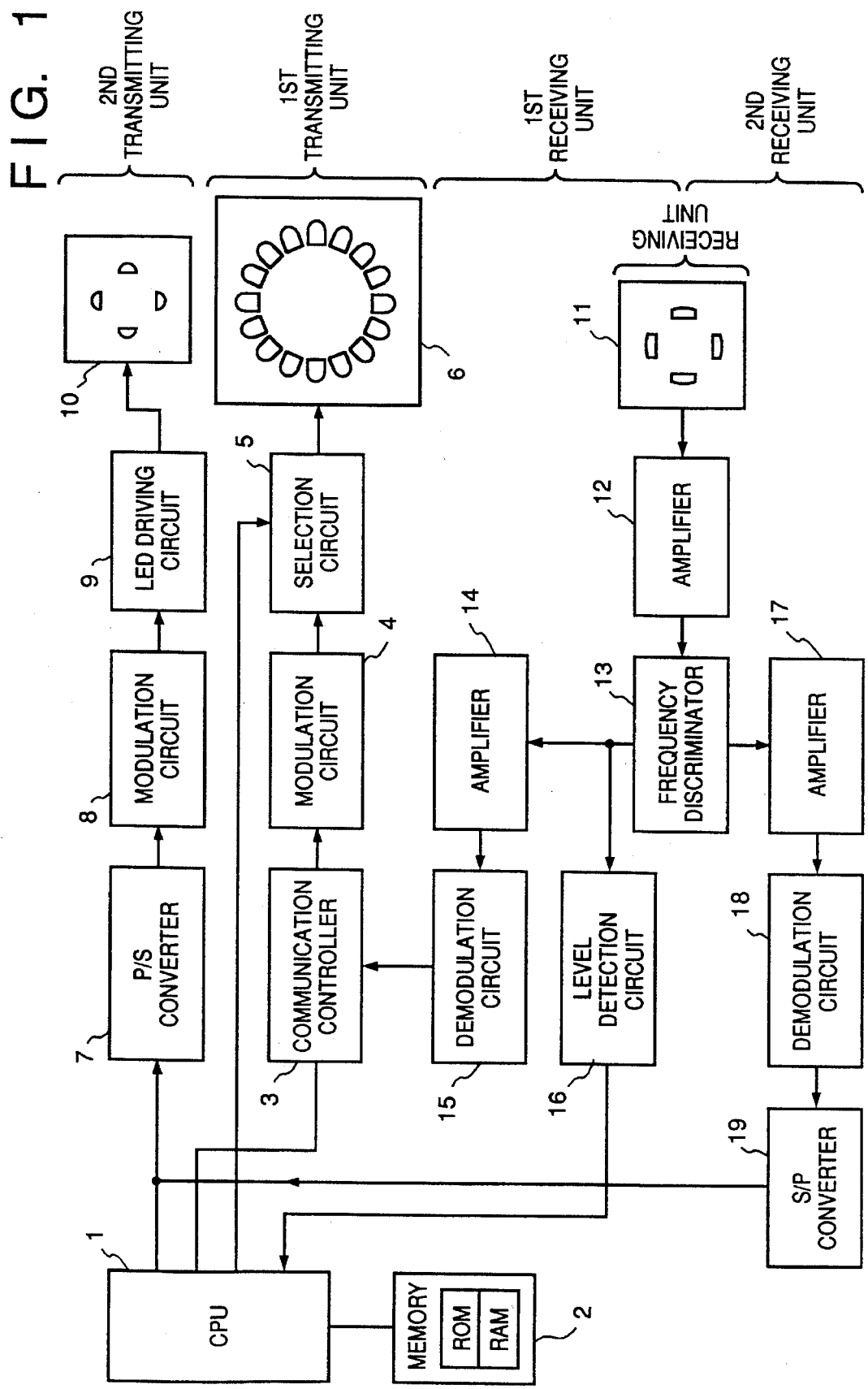
FIG. 1 is a block diagram of the communication apparatus of the embodiment.

FIG. 1 is a block diagram of the communication apparatus in the embodiment.

In FIG. 1, numeral 1 is a CPU as a processor which executes proceedings and programs, and numeral 2 is a memory comprised of a ROM storing the operation procedure (including the programs according to the flowcharts of FIGS. 4 and 5 to be described later) and a RAM used as a work area. Numeral 3 is a communication controller comprised of parallel/serial converter and encoder/decoder. Numeral 4 is a modulator which performs a modulation based on the output from the communication controller 3, and modulates a predetermined sub-carrier wave signal (the frequency is 5–6 MHz) by well-known modulation method such as PSK and QAM (Note that a main carrier wave is infrared rays). Numeral 5 is a direction selection circuit which selectively drives one of the LED group 6 based on the control signal from the CPU 1. The LED group 6 can efficiently radiate an optical signal to a desired direction since the infrared ray LEDs of the narrow directivity having a high refractive index are arranged at 22.5° step in the shape of circle. The first transmitting unit is comprised of the numerals 3–6.

Numerals 7–10 are components of the second transmitting unit. Numeral 7 is a parallel-serial converter (P/S converter), numeral 8 is a modulator which performs a modulation on a predetermined subcarrier wave signal (the frequency is 50–60 KHz) by the well-known modulation method such as PPM or ASK (100% AM Modulation). Numeral 9 is a LED driving circuit which drives each of the LEDs simultaneously. The four LEDs of the LED group 10 having a wide directivity are arranged in the shape of circle at step of 90°, and the optical signals are radiated to all directions. Since the sub-carrier wave frequency of the second transmitting unit is lower than that of the first transmitting unit, the transmission rate of the second transmitting unit is lower than that of the first transmitting unit. Accordingly, the speed of response of the LED in the LED group 10 can be lower than that of the LED group 6. Furthermore, the LED group 6 and the LED group 10 are arranged in the same circumference.

Since the second transmitting unit drives the LEDs of a wide directivity, the optical signal of the second transmitting unit cannot reach the same distance as the first transmitting unit, if the second transmitting unit is driven by larger electric current than the first transmitting unit. On the other hand, since the subcarrier frequency of the second transmitting unit is low, and the modulation method such as PPM or ASK is used, the width of LED drive pulse can be decreased (5–6% as duty). Accordingly, when three LEDs are simultaneously driven, the electric power is substantially the same as that required in the first transmitting unit.

Furthermore, even though it is not shown in the figure, the present apparatus includes an interface for connecting with a personal computer.

Incidentally, the second transmitting unit includes high frequency components, since the LED is driven by the pulse signal. If high frequency components are radiated from the LED group 10, it disturbs the communication of the first transmitting unit. Accordingly, the LED group 10 needs to have a minimum response speed so that the high frequency components are removed.

Numeral 11 is a group of pin-photo diodes which convert optical signal to electric signal. In the group of the pin-photo diodes 11, four diodes having wide directivity are arranged in the shape of circle at 90° steps so as to receive the optical signal from any direction. Furthermore, the pin-photo diodes are molded by resin capable of removing visual light, and only the infrared ray can be passed.

The converted electric signal is amplified by the amplifier 12, and then, transmitted to the frequency discriminating circuit 13. The frequency discriminating circuit 13 is comprised of a filter circuit, and separates the received signal into high frequency components (signal components of the first transmitting unit) and low frequency components (signal components of the second transmitting unit).

The high frequency component is amplified to a predetermined level by the amplifier 14 having an AGC (Auto Gain Controller). Subsequently, it is demodulated by the demodulating circuit 15 and outputted to the communication controller 3 as a digital signal.

The high frequency component is also outputted to the level detection circuit 16. The level detection circuit 16 comprised of a low-pass filter, a peak hold circuit and an A/D converter detects the signal intensity of the high frequency component, and outputs the signal intensity to the CPU 1. The first reception unit is comprised of numerals 11–16.

On the other hand, the low frequency component is amplified to a predetermined level by the amplifier 17 having an AGC. After demodulated by the demodulator 18, the amplified component is outputted to the CPU 1 via the serial-parallel converter 19. The second reception unit is described above.

Figure 3:
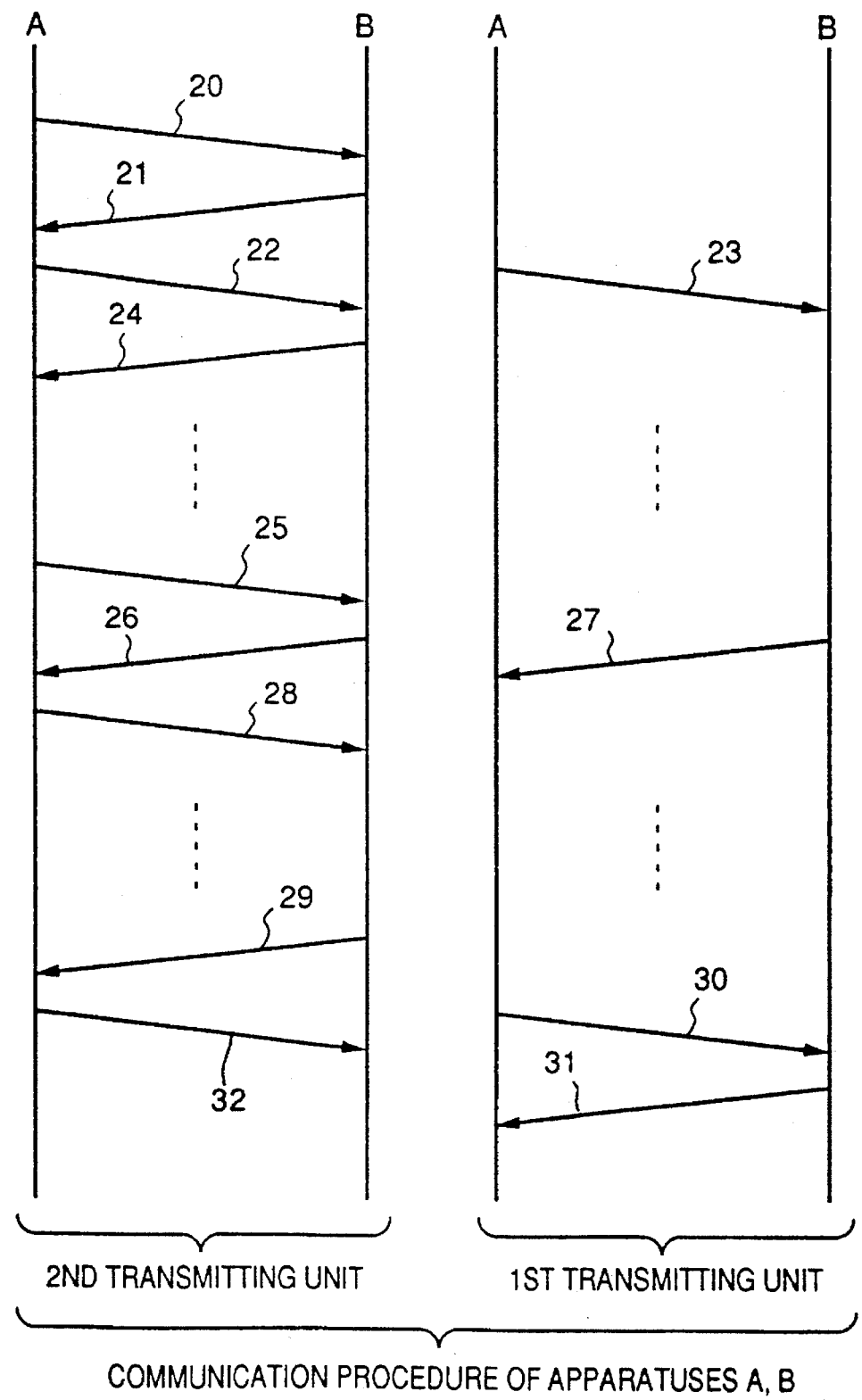
FIG. 3 is a diagram illustrating the communication flow of the embodiment.

The method of determining the direction of radiation in the first transmitting unit is described with reference to the communication flow as shown in FIG. 3. Note that the communication is performed between the apparatus A and the apparatus B. Both apparatuses A and B have the structure concerning the transmission/reception as shown in FIG. 1.

In FIG. 3, the left side shows the communication flow of the second transmitting unit, while the right side shows the communication flow of the first transmitting unit.

The case where there is a request to start the communication in the apparatus A and the direction of the radiation of communication waves from the apparatus A is detected is described below.

The apparatus A confirms that the second reception unit receives no other signal for a predetermined period. If any communication signal is received, the end of the communication is waited, since it is judged that the apparatus B is in communication with other apparatus or apparatuses other than the apparatuses A and B are communicating in the area where the apparatus A is capable of communication.

After it is confirmed that no other communication is performed, the apparatus A issues a communication request message 20 to the apparatus B in the LED group 10. The communication request message 20 comes in the apparatus B because it is radiated in a wide area, even though the transmission rate is low. On the other hand, the apparatus B transmits a communication permission message 21 in response. Subsequently, the apparatus A issues a level detection message 22 in the second transmitting unit, and a test message 23 in the first transmitting unit to an arbitrary direction. The apparatus B transmits the volume of the received test message 23 by a level information message 24.

In this case, the apparatus B has a possibility of not receiving the test message 23, however, the apparatus B can recognize that the apparatus A transmits the test message 23 by the level detection message 22. Accordingly, if the test message is not detected, the information message 24 is transmitted as the level "0".

The apparatus A repeats the operation concerning the messages 22–24 in all directions of the first transmitting unit (16 times in the embodiment), and detects the direction where the test message comes in at the maximum level. Subsequently, a detection end message 25 is issued, and the apparatus B is informed that the direction detecting processing has ended.

Next, the transmitting direction of the apparatus B is determined. The transmission/reception of the communication request message and communication permission message is not needed, since it does not need to check if the communicating party A can communicate.

In the figure, numeral 26 is a level detection message, numeral 27 is a test message, and numeral 28 is a level information message. Similar to the apparatus A, the operation concerning the messages 26–28 is repeated on all directions, and the direction where the test message comes in at the maximum level is detected. Subsequently, the detection end message 29 is issued, and the apparatus A is informed that the level detection process has ended. The apparatuses A and B perform normal communications (messages 30 and 31) in accordance with the confirmed direction by the first transmitting unit, that is, the maximum level direction.

During the execution of normal communication by the first transmitting unit, the apparatus A (it can be the apparatus B or the apparatuses A and B can alternate) continues to issue the in-communication message 32 from the second transmitting unit at predetermined intervals in order to start the communication of the third apparatus C when the apparatuses A and B are in the communication.

At the beginning of the description relating to FIG. 3, the apparatus A confirms that the second receiving unit does not receive any communication signal. This is executed not only when a searching processing is started, but when a normal communication is started. Accordingly, it is possible to avoid the third apparatus C erroneously starting communication and disturbing the current communication by issuing the in-communication message during the communication.

Since the first transmitting unit radiates an optical signal only to a particular direction, the signal may not reach the apparatus C. Accordingly, the in-communication message needs to be issued by the second transmitting unit.

There may be a case where an apparatus at the reception side does not receive the in-communication message for some reason (e.g., when a person/an object shuts out the optical signal at the moment when the in-communication message is transmitted). Therefore, as shown in FIG. 3, the transmission/reception of the communication request message and communication permission message is added to the process. If the in-communication message is a response to the communication request message, the start of the search process or normal communication is waited until the communication ends. Furthermore, the communication request message and communication permission message need to be issued by the second transmitting unit.

Figure 4:
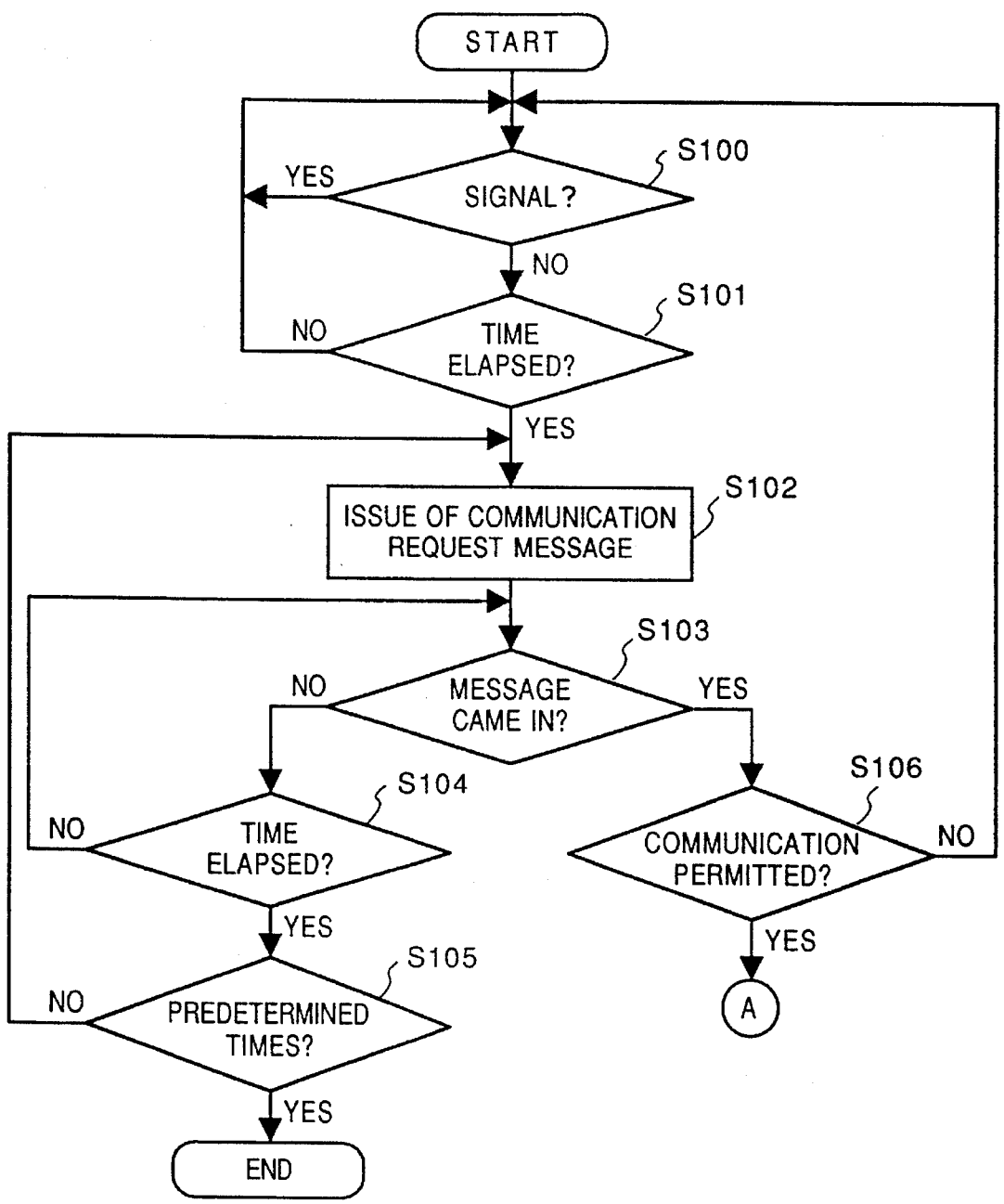
FIG. 4 is a flowchart for explaining the processing operation of the embodiment.
Figure 5:
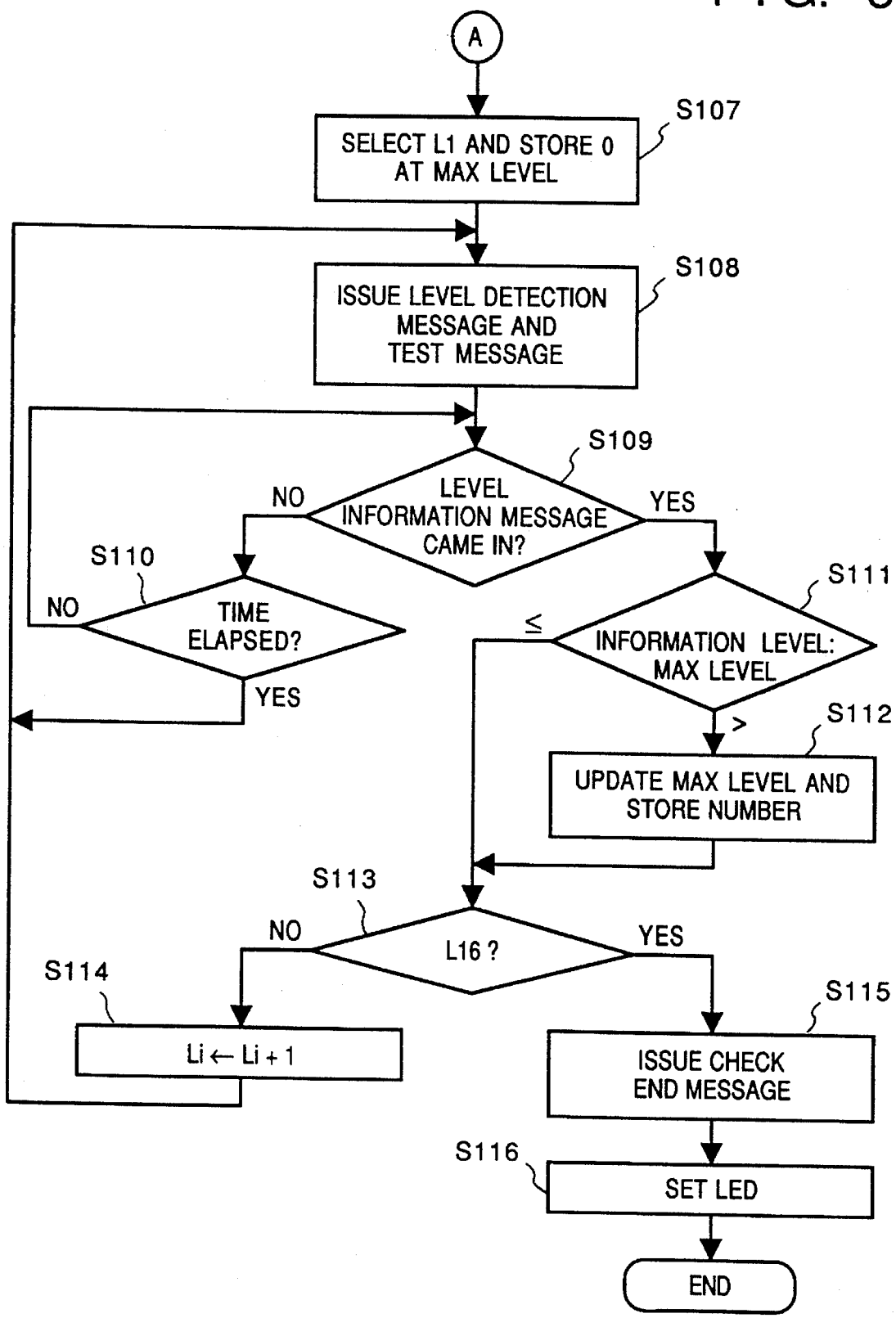
FIG. 5 is another flowchart for explaining the processing operation of the embodiment.

FIG. 4 is a flowchart illustrating the process until the direction of the first transmitting unit is determined. Reference numerals L1–L16 are respectively referred to each of the infrared ray LEDs in the LED group 6 of the first transmitting unit.

At steps S100 and S101, the second receiving unit is supervised for a predetermined period, and the CPU 1 waits until no signal is received during the passage of the predetermined period. If no signal is received after the predetermined time has been elapsed, the process proceeds to step S102 where the communication request message is issued to the communicating party. At step S103, it is determined if any message is received.

If no message is received, the process proceeds to step S104 where it is determined that a predetermined period of time has elapsed. If not, the process returns to step S103 where a message is waited for a predetermined period. If no message is received during the predetermined period, since it is assumed that the communication request message has not reached to the other apparatus, the process of step S102 is performed. If no message is received after the process of step S102 is repeated for a predetermined times (this is determined at step S105), it is determined that the apparatus of the other party is not located at a position where information communication can be performed.

Furthermore, if it is determined that a message is received after the communication request message is transmitted, the process proceeds from step s103 to step S106. At step S106, it is determined if the received message is a communication permission message, that is, a message for responding to the communication request message. If not, it is determined that a message communicated among another apparatuses was received, and the process returns to step S100.

Accordingly when the communication permission message is received, and the existence of the other party is confirmed, the process proceeds to step S107.

At step S107, an infrared ray LED indicated by L1 is selected, and the value reserved at a predetermined address position in the memory 2 is cleared as "0". As apparent from the description below, the maximum value of the information level issued from the other party is stored in this address position.

When the process proceeds to step S108, a test message is issued by using the selected LED of the first transmitting unit (L1 at the beginning), and a level detection message is transmitted by the second transmitting unit at the same time.

At steps S109 and S110, a response of the level information message is waited for a predetermined period. If no level information message is received after the predetermined time has been elapsed, the process returns to step S108 where the test message is reissued at the selected LED, and the test message by the second transmitting unit is issued.

Furthermore, at step S109, if it is determined that the level information message is received, the process proceeds to step S111 where the received information level and the current maximum value (stored in the predetermined address) are compared. If the information level issued from the other apparatus is larger than the informed level received before, the maximum level is updated, and the LED number selected at that time is stored in a predetermined address of the RAM of the memory 2.

Subsequently, the process proceeds to step S113 where it is determined whether or not the currently selected LED is "L16", that is, the last LED is checked is determined. If not checked, the LED number is advanced by one in order to select the next LED, and the process returns to step S108.

As described above, when the last LED is checked, the process proceeds to step S115 where the check end message is issued. At this time, at the predetermined address position in the RAM of the memory 2, the maximum level and the selected LED number (or direction) is stored. Accordingly, at step S116, the LED which has issued the maximum level is selected, and thereafter, the information communication is performed by using the selected infrared ray.

Figure 9:
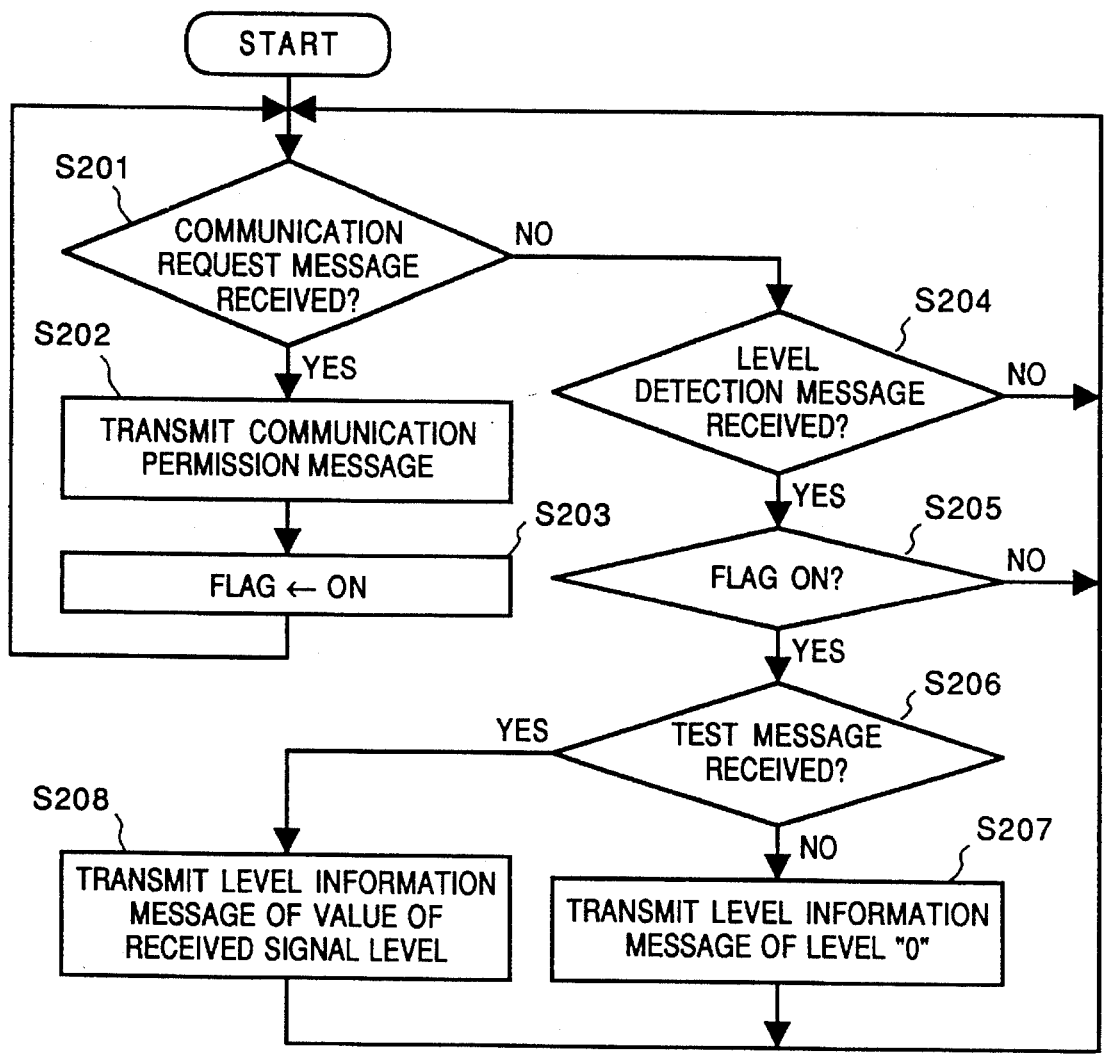
FIG. 9 is a flowchart illustrating the processing procedure in a communicating party in the embodiments.

Furthermore, the processing procedure in the communication apparatus of the receiving side is easily understood from the above description. An example is shown in the flowchart of FIG. 9. Assume that the structure of the communication apparatus of the communicating party is similar to that of FIG. 1.

At step S201, whether or not a communication request message is received is determined. If received, the process proceeds to step S202 where a communication permission message is transmitted from the second transmitting unit. To confirm that a communication direction determining process is being performed, at step S203, the flag reserved in the RAM in advance is turned on.

Accordingly, when the level detection message is detected, the process proceeds from step S204 to step S205 where whether or not the flag is turned on is determined. That is, even if the level detection message is received, when the communication request message has not been received in the previous step, the following process is not performed.

If the flag is "on", the process proceeds to step S206 where whether or not the test message is received is determined. If not, the process proceeds to step S207 where "0" level information message is transmitted from the second transmitting unit. On the other hand, if the test message is received, the reception level is detected by the level detection circuit 16, and the detected level is transmitted from the second transmitting unit as a level information message.

The embodiment has two systems (units) of the communication means which are different from the conventional technique. Accordingly, if the efficiency of electric power is increased by providing the communication means of the first unit as narrow directivity, when a large amount of the electric power is consumed in the communication means of the second units, the electric power cannot be saved. However, as described above, the communication means of the second unit is used when the direction is determined and at the normal communication for a short period of time, therefore, the consumption of the electric power can be reduced.

As described above, according to the embodiment, an apparatus is capable of communicating at a minimum electric power by having the optical signal radiation means of narrow directivity, and automatically determines the direction of radiation.

<Another Embodiment>

In the above embodiment (the first embodiment), the level detection circuit is provided at the reception side. However, if communication is over the certain distance, the number of infrared ray LEDs capable of communication is 1–2. Accordingly, if the level of a received signal is not detected, the direction can be determined by knowing whether or not the communication is succeeded. The success/failure of the communication is known when the optical signal does not reach. However, if the check sequence such as CRC code added to a message is transmitted, when the optical signal is barely reached, but S/N is insufficient, this is determined as a "failure".

When the direction of the success/failure of communication is determined, the level information message described in FIG. 3 is determined as a communication success/failure message which informs the success/failure of the communication, and the receiving side selects the infrared LED in the direction where the communication has succeeded.

Figure 6:
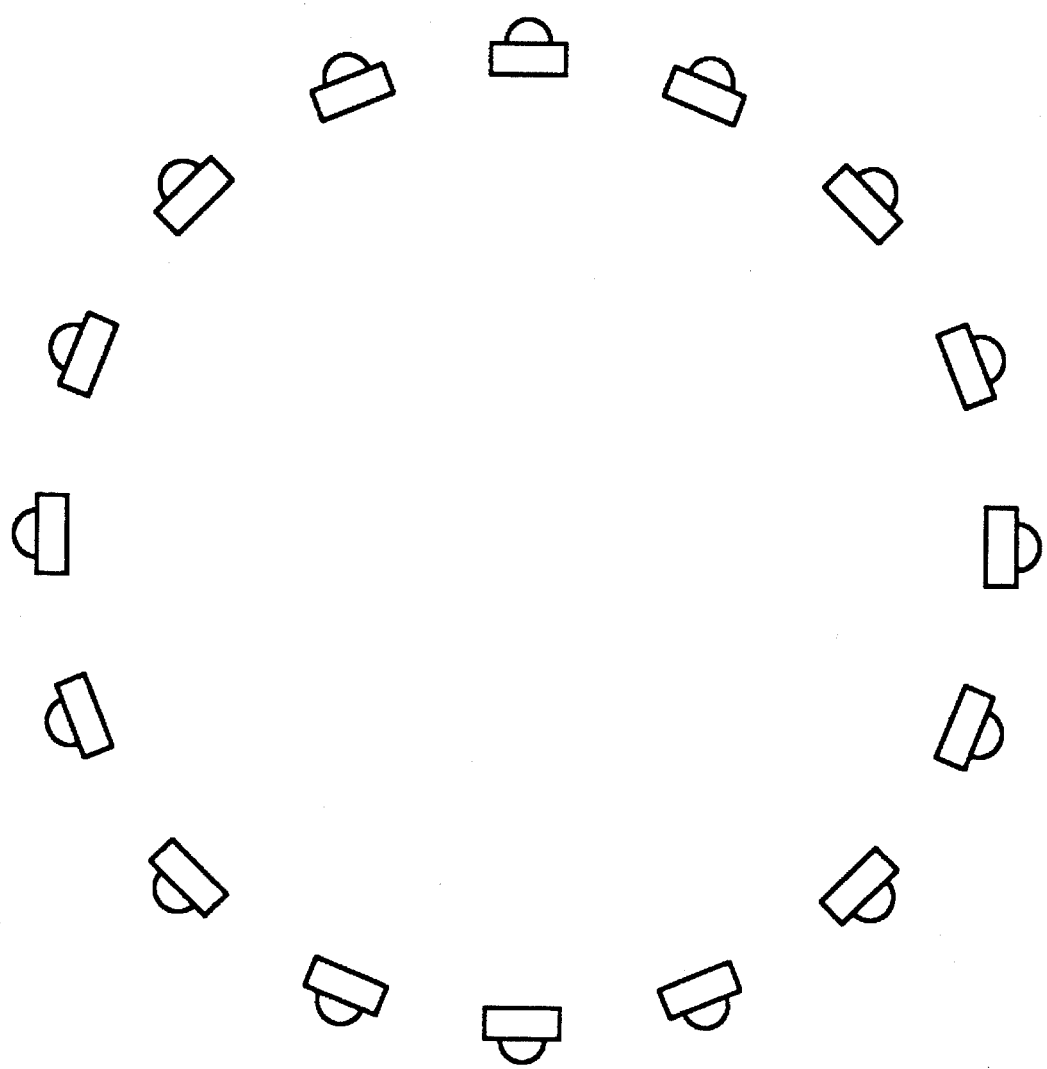
FIG. 6 is a diagram illustrating the arrangement of pin-photo diodes of the second embodiment.

In the above embodiment, the first transmitting unit has a narrow directivity, and the first receiving unit is non-directivity. However, it can be arranged that the first transmitting unit is non-directivity, and the first receiving unit has a narrow directivity. The receiving unit of narrow directivity is shown in FIG. 6, and a plurality of pin-photo diodes are arranged in the shape of circle. Furthermore, each of the diodes is selectively activated. Accordingly, a circuit to select the direction of the reception unit can be added to the structure of FIG. 1.

Figure 7:
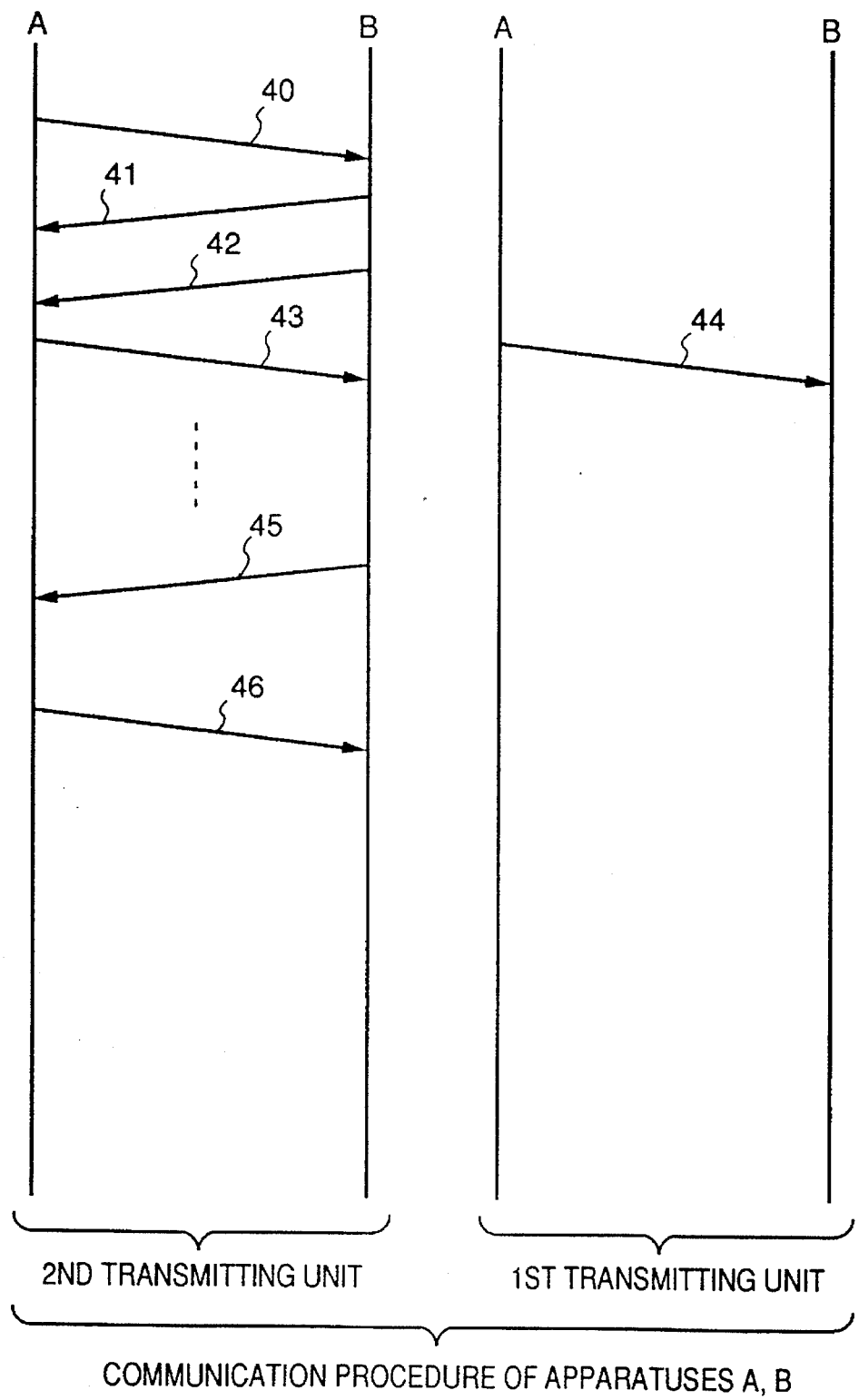
FIG. 7 is a diagram illustrating the communication flow of the second embodiment.

In this case, the reception side of the first communication means takes an initiative in the processing operation. The communication flow is shown in FIG. 7.

When it is confirmed that another communication is not performed, the apparatus A issues the communication request message 40 to the apparatus B. On the other hand, the apparatus B transmits the communication permission message 41, and subsequently issues the test message request message 42. The apparatus A which receives the test message request message 42 issues the request confirmation message 43 using the second transmitting unit, and the test message 44 by the first transmitting unit. The apparatus activates the pin-photo diode in an arbitrary direction, and waits for the test message 44. The process concerning the messages 42–45 is performed on all directions, and the direction where the test message 44 is received at the maximum level is detected. If the level detection is not performed, the direction where the communication is succeeded is detected. When the detection is succeeded, the apparatus A issues the detection end message 46, and the apparatus B is informed that the direction detecting process has been ended.

As described above, either the transmitting unit or the receiving unit of the first communication means can include the characteristic of narrow directivity. Of course, both of the transmitting unit and the receiving unit of the first communication means can include the narrow directivity. In this case, on the combination of all directions for transmission/reception, levels and success/failure of the communication are sequentially detected.

Figure 2:
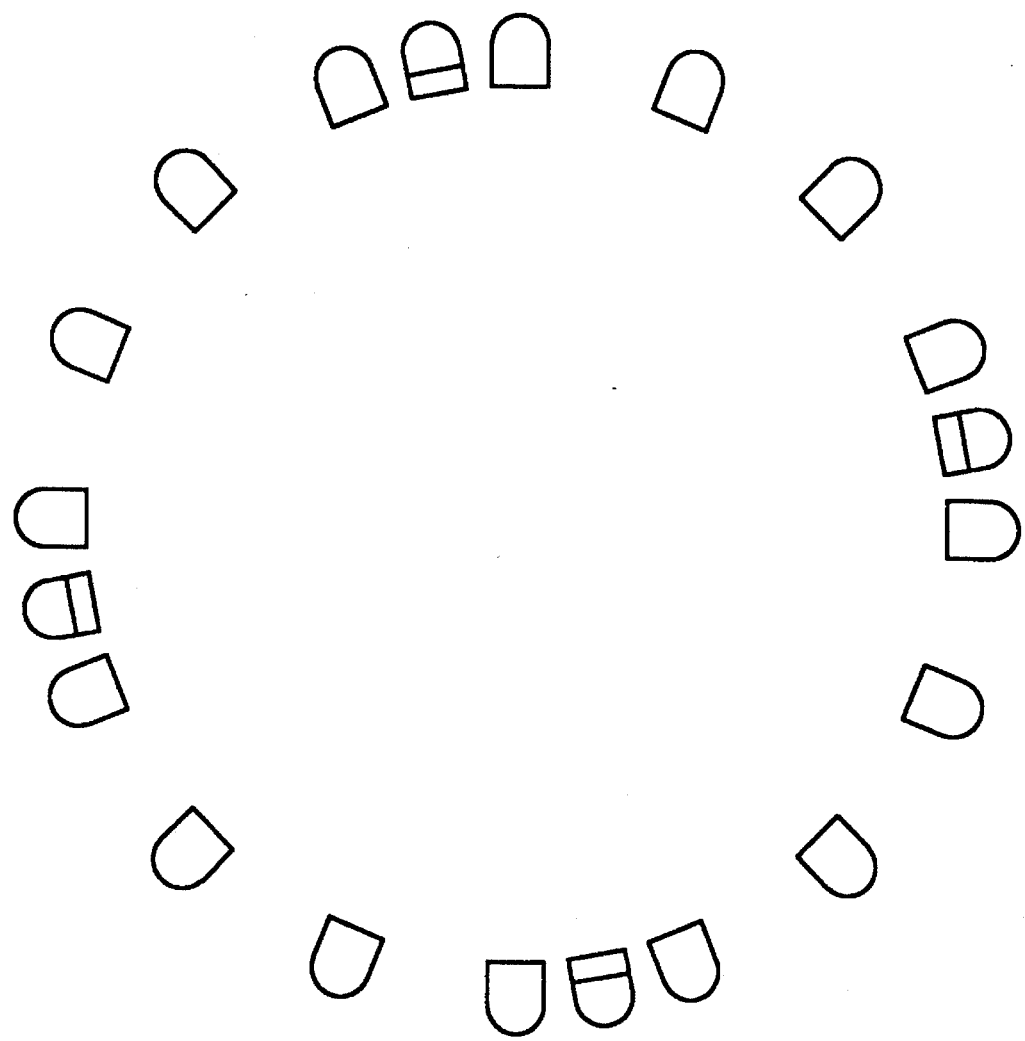
FIG. 2 is a diagram illustrating the arrangement of the infrared ray LEDs.
Figure 8:
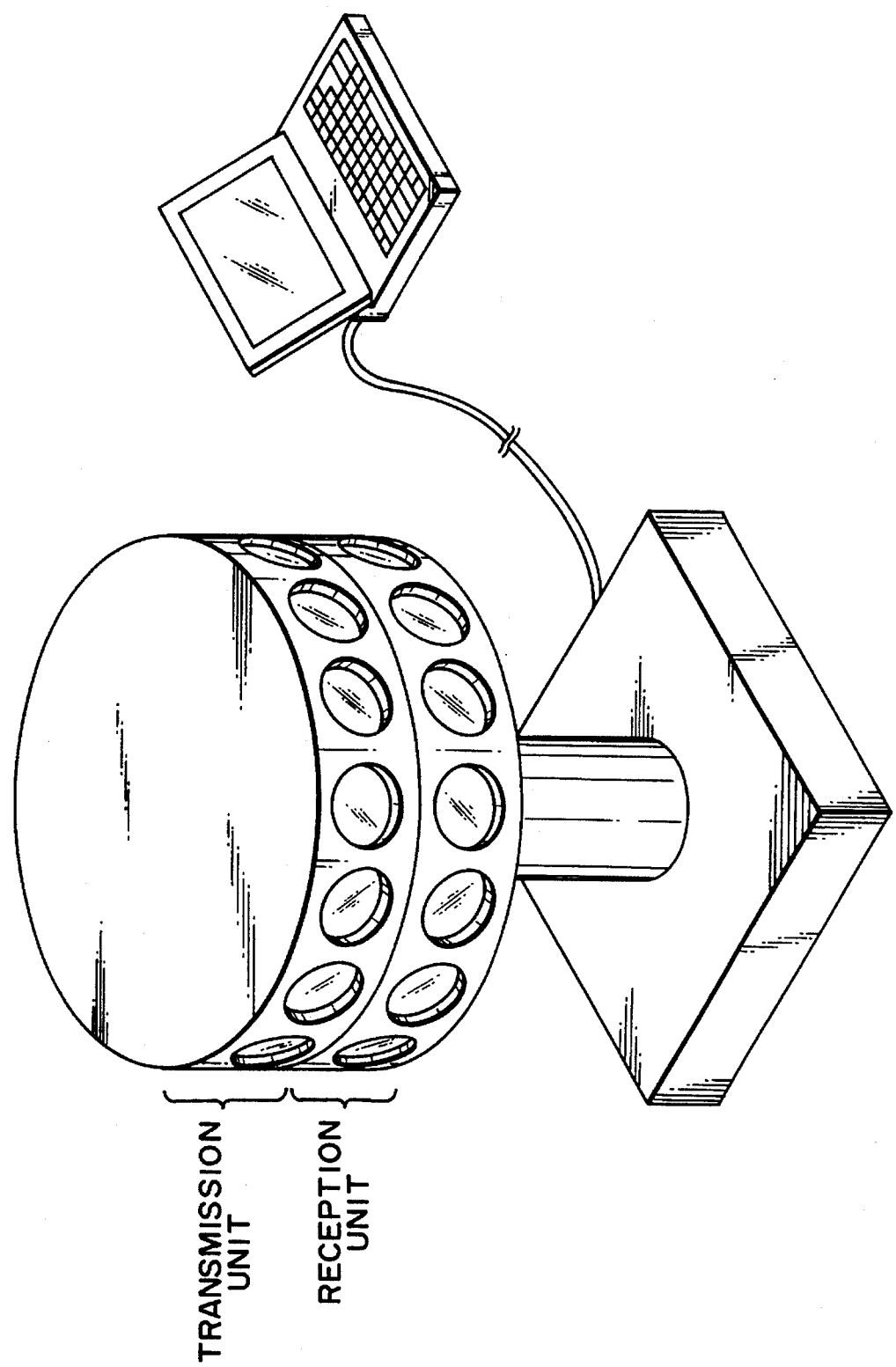
FIG. 8 is an external view of the communication apparatus in the embodiments.

However, when the structure of the transmitting unit is as FIG. 2 and that of the receiving unit is as FIG. 6, and both are contained in a same case, the process to detect the direction becomes easy. Because the direction of the receiving unit (or the transmitting unit) becomes the same direction as the direction of the transmitting unit (or the receiving unit). In addition, the space can be decreased by containing both in the same enclosure. FIG. 8 shows the state where the apparatus of the embodiment is connected to a personal computer. The interface with the computer can be bidirectional interface such as RS-232C or SCSI interface.

In the above embodiment, to change the direction of the directivity, optical elements of narrow directivity are arranged in the shape of circle, and alternatively switched. However, a plate mounting the optical elements can be rotated by a motor or the reflection plate in a concavity shape can be rotated by the motor. Furthermore, the present invention can be applied to the communication apparatuses using not only light waves, but also other types of waves.

In the embodiment, only the communication apparatus is described, however, it can be applied to a personal computer or a printing device. Furthermore, it can be connected to another electric device so that data communication is performed between them.

The present invention can be applied to a system constituted by a plurality of devices, or to an apparatus comprising a single device. Furthermore, it goes without saying that the invention is applicable also to a case where the object of the invention is attained by supplying a program to a system or apparatus.

In the embodiment, the infrared ray is taken as an example, however, this does not impose a limitation upon the invention.

As described above, even if the mounting position of the communication apparatus is changed, the transmission directivity can be adjusted to the communicating party by a simple arrangement.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus which performs an information communication by using wave motion in space propagation, comprising:

first transmission means for transmitting information at a first speed with a first directivity;

changing means for successively changing a transmission direction of the information to be transmitted by said first transmission means;

second transmission means for transmitting information at a second speed lower than the first speed with a second directivity wider than the first directivity;

reception means for receiving information transmitted from a communicating party of said communication apparatus;

testing means for performing a plurality of testing processes, each of which transmits a first message in a predetermined direction by said first transmission means, and a second message indicating that the first message is being transmitted by said second transmission means whenever the transmission direction of the first message to be transmitted by said first transmission means is changed by said changing means; and selection means for selecting one of the transmission directions of the first message to be transmitted by said first transmission means in accordance with a third message transmitted from the communicating party, in response to the second message transmitted in each of the testing processes performed by said testing means.

2. The communication apparatus according to claim 1, wherein said wave motion is infrared rays.

3. The communication apparatus according to claim 1, where said first transmission means comprises a plurality of transmission elements of narrow directivity, each transmission element is arranged radially, and said changing means changes a transmission direction by selecting one of the elements.

4. A control method in a communication apparatus comprising:

first transmission means for transmitting information at a first speed with a first directivity by using a wave motion in a space propagation;

changing means for changing a transmission direction of the information to be transmitted when a transmission is performed by said first transmission means;

second transmission means for transmitting information at a second speed lower than the first speed with a second directivity wider than the first directivity; and reception means for receiving information transmitted from a communicating party of said communication apparatus, said method comprising the steps of:

transmitting a first message in a predetermined direction by said first transmission means, while said second transmission means transmits a second message indicating that the first message is being transmitted whenever the direction of the information to be transmitted by said first transmission means is changed by said changing means; and selecting the transmission directions of the first message to be transmitted by said first transmission means in accordance with a third message transmitted from the communicating party which is received in response to each of the second messages transmitted by said second transmission means.

5. The method according to claim 4, wherein said wave motion is infrared rays.

6. The method according to claim 4, wherein said first transmission means is comprised of a plurality of transmission elements of narrow directivity, each transmission element is arranged radially, and said changing means changes a transmission direction by selecting one of the elements.

7. A communication control system which performs information transmission by using wave motion in space propagation, an apparatus at a transmitting side comprising:

first transmission means having a narrow directivity and a high transmission speed;

second transmission means having a substantially non directivity and a low transmission speed;

changing means for changing a transmission direction by said first transmission means;

test transmission means for transmitting a test message by said first transmission means, and an indication message which indicates that the test message is being transmitted by said second transmission means;

control means for controlling said changing means and energizing said test transmission means whenever the transmission direction of said first transmission means is changed by said first transmission means;

first reception means for receiving an acknowledgment message transmitted by an apparatus of the communicating party of said apparatus at the transmitting side when the test transmission means is energized by said control means; and determination means for determining the transmission direction of said first transmission means based on the acknowledgement message received by said reception means, and the apparatus of the communicating party comprising:

second reception means for discriminating and receiving the test message and indication message transmitted from said apparatus at the transmitting side; and third transmission means for transmitting the reception state of the test message as an acknowledgment message when the indication message is received by said second reception means.

8. The system according to claim 7, wherein said wave motion is infrared rays.

9. The system according to claim 7, wherein said first transmission means comprises a plurality of transmission elements of narrow directivity, each transmission element being arranged radially, and said changing means changes a transmission direction by selecting one of the elements.

10. The system according to claim 7, wherein said first reception means and second reception means are substantially non directivity.

11. The system according to claim 7, wherein said third transmission means is substantially non directivity.

12. A control method of a communication control system which performs an information transmission by using wave motion in space propagation, an apparatus at a transmitting side comprising:

first transmission means having narrow directivity and a high transmission speed;

second transmission means having substantially non directivity and a low transmission speed;

changing means for changing the transmission direction by said first transmission means; and first reception means for receiving an acknowledgement message transmitted by an apparatus of a communicating party of said apparatus at the transmitting side, and an apparatus at the communicating party comprising:

second reception means for discriminating and receiving a test message and an indication means; and third transmission means for transmitting an acknowledgement message to said first reception means, and the control method at the transmitting side comprising:

a test transmission step of transmitting the test message from said first transmission means, and an instruction which instructs that the test message is being transmitted;

a control step of energizing said test step when said changing means is controlled, and the transmission direction of said first transmission means is changed;

a step of receiving the acknowledgment message transmitted by the apparatus of the communicating party by said first reception means when the test transmission step is repeatedly energized by said control step; and a determination step of determining the transmission direction of said first transmission means based on the acknowledgment message received by said reception means, and the control method of the communicating party comprising:

a step of transmitting the reception state of the test message as the acknowledgment message by said third transmission means when the indication message is received by said second reception means.

13. The system control method according to claim 12, wherein said wave motion is infrared rays.

14. The system control method according to claim 12, wherein said first transmission means is comprised of a plurality of transmission elements of narrow directivity, each transmission element is arranged radially, and said changing means selectively energizes one of the elements.

15. The system control method according to claim 12, wherein said first reception means and second reception means are substantially non directivity.

16. The system control method according to claim 12, wherein said third transmission means is substantially non directive.

17. A communication apparatus which performs an information reception by using a wave motion in a space propagation, comprising:

transmission means having non directivity;

reception means having a narrow directivity capable of setting the receiving direction in a desired direction;

first control means for transmitting a message which requests an apparatus of a communicating party of said communication apparatus to transmit a test message via said transmission means;

changing means for changing the receiving direction of said reception means whenever said first control means performs a transmission process of the requested massage;

second control means for performing reception of the test message from said reception means whenever said changing means is energized; and determination means for determining the most suitable direction of said reception means by said second control means.

18. The communication control apparatus according to claim 17, wherein said wave motion is infrared rays.

19. The communication control apparatus according to claim 17, wherein said first reception means is comprised of a plurality of reception elements having narrow directivity, each reception element is arranged radially, and said changing means changes a receiving direction by selecting one of the elements.

20. A control method of a communication apparatus including transmission means having substantially no directivity and reception means having narrow directivity capable of setting a receiving direction to a desired direction, which performs information reception by using wave motion in space propagation, comprising:

a message transmission step of transmitting a message which requests a communicating party of said communication apparatus to transmit a test message via said transmission means;

a changing step of changing the receiving direction whenever a transmission process of the request message is performed;

a reception step of receiving the test message from said reception means whenever the receiving direction of said receiving means is changed by said changing step and a determination step of determining the most suitable direction of said reception means based on a reception result by said reception step.

21. The control method of the communication apparatus according to claim 20, wherein said wave motion is infrared rays.

22. The control method of the communication apparatus according to claim 20, wherein said reception means is comprised of a plurality of reception elements of narrow directivity, each reception element is arranged radially, and said changing step changes a reception direction by selecting one of the elements.

* * * * *

UNITED STATES PATENT AND TRADEMARK OFFICE
CERTIFICATE OF CORRECTION

PATENT NO. : 5,526,161

DATED : June 11, 1996

INVENTORS : NORIYUKI SUZUKI ET AL.

Page 1 of 4

It is certified that error appears in the above-identified patent and that said Letters Patent is hereby corrected as shown below:

COLUMN 1

Line 9, "electromagnet," should read --electromagnetic,--

Line 57, "non directivity;" should read
        --non-directivity;--.

COLUMN 2

Line 9, "non directivity;" should read
        --non-directivity;--;

Line 33, "non directivity;" should read
        --non-directivity;--;

Line 40, "control means" should read --control system--;

Line 61, "non directivity;" should read
        --non-directivity;--.

COLUMN 3

Line 28, "non directivity;" should read
        --non-directivity;--;

Line 31, "request" should read --requests--.

UNITED STATES PATENT AND TRADEMARK OFFICE
CERTIFICATE OF CORRECTION

PATENT NO. : 5,526,161

DATED : June 11, 1996

INVENTORS : NORIYUKI SUZUKI ET AL.

It is certified that error appears in the above-identified patent and that said Letters Patent is hereby corrected as shown below:

COLUMN 4

Line 48, "step" should read --steps--;
  Line 55, "subcarrier" should read --sub-carrier--;
  Line 60, "step" should read --steps--.

COLUMN 5

Line 8,  "subcarrier" should read --sub-carrier--;
  Line 52, "demodulated" should read --being demodulated--.

COLUMN 7

Line 37, "not reached to" should read --not reached--;
  Line 39, "times" should read --number of times--;
  Line 45, "step s103" should read --step S103--.
  Line 51, "Accordingly" should read --Accordingly,--.

COLUMN 9

Line 12, "is" should read --has--.

UNITED STATES PATENT AND TRADEMARK OFFICE
CERTIFICATE OF CORRECTION

PATENT NO. : 5,526,161

DATED : June 11, 1996

INVENTORS : NORIYUKI SUZUKI ET AL.

Page 3 of 4

It is certified that error appears in the above-identified patent and that said Letters Patent is hereby corrected as shown below:

<u>COLUMN 10</u>

Line 7,  "bidirect" should read --bi-direc- --;
  Line 11, "alternatively" should read --alternately--.

<u>COLUMN 11</u>

Line 7,  "where" should read --wherein--;
  Line 53, "a" should be deleted and "non" should read
           --non- --.

<u>COLUMN 12</u>

Line 24, "non directivity." should read
           --non-directivity.--;
  Line 26, "non directivity." should read
           --non-directivity.--.

<u>COLUMN 13</u>

Line 12, "non directivity." should read
           --non-directivity.--;
  Line 14, "non" should read --non- --;

UNITED STATES PATENT AND TRADEMARK OFFICE
CERTIFICATE OF CORRECTION

PATENT NO. : 5,526,161

DATED : June 11, 1996

INVENTORS : NORIYUKI SUZUKI ET AL.

It is certified that error appears in the above-identified patent and that said Letters Patent is hereby corrected as shown below:

COLUMN 13 continued

Line 19, "non directivity;" should read
--non-directivity;--;
Line 28, "mas-" should read --mes--;
Line 37, "control" should be deleted.

COLUMN 14

Line 1, "control" should be deleted;
Line 22, "step" should read --step;--.

Signed and Sealed this

Fifteenth Day of October, 1996

Attest:

BRUCE LEHMAN

Attesting Officer   Commissioner of Patents and Trademarks